Sept. 30, 1952 — M. P. LAURENT — 2,612,340
ROTARY PLUG VALVE
Filed May 12, 1948 — 4 Sheets-Sheet 1

Inventor
MILTON P. LAURENT
By Attorney.

Sept. 30, 1952        M. P. LAURENT        2,612,340
ROTARY PLUG VALVE Filed May 12, 1948                                  4 Sheets—Sheet 2

Inventor
MILTON P. LAURENT
By
Attorney

Sept. 30, 1952 M. P. LAURENT 2,612,340
ROTARY PLUG VALVE
Filed May 12, 1948 4 Sheets-Sheet 3

Inventor
MILTON P. LAURENT
By *[signature]*
Attorney.

Sept. 30, 1952  M. P. LAURENT  2,612,340
ROTARY PLUG VALVE
Filed May 12, 1948  4 Sheets-Sheet 4

Inventor
MILTON P. LAURENT
By
Lee B. Lemon
Attorney

UNITED STATES PATENT OFFICE 2,612,340

ROTARY PLUG VALVE

Milton P. Laurent, Houston, Tex.

Application May 12, 1948, Serial No. 26,606

17 Claims. (Cl. 251—93)

This invention relates to plug valves. More particularly it pertains to a rotary plug valve which is extremely effective in controlling the flow in conduits carrying fluids which may be at high temperature, high pressure, and/or of a corrosive nature, without leakage or wear of the sealing surfaces of the valve.

Some plug valves which have been employed under such adverse conditions have been provided with a sectional head having closure elements which are forced outwardly mechanically to seat against the ports in the valve housing in order to effect a tight seal when the valve is closed. Most known valve constructions of this type, however, are so designed that during movement of the valve between open and closed positions, a wiping or sliding action takes place between the sealing surfaces of the valve while these surfaces are under load, i. e. pressed together in sealing engagement. It has been observed that under high temperature and/or corrosive conditions most metals become coated with an oxide protective film. Such a film on valve sealing surfaces, if not rubbed off by abrasive action, tends to prolong the effective lift of the surfaces. A wiping or dragging action between valve sealing surfaces that are loaded, however, not only destroys this protective film, but also causes rapid wear and sometimes galling of the accurately machined surfaces with consequent leakage.

The sealing surfaces of plug valves of the type under consideration may be placed under load, i. e. forced together, not only mechanically but also hydraulically, which latter loading in valves of known construction may develop a situation known as pressure lock. Valve sealing surfaces are loaded hydraulically when the valve is in closed position and has a fluid pressure within the housing that is greater than the pressure in the line on one or both sides of the valve. Most valves now in service are so designed that relief of the mechanical seating forces on the port closure elements does not positively unseal the valve to equalize any such pressure differential between the housing and the line. The retention of such an hydraulic load results in the detrimental wiping action above described during the initial movement of the valve from closed to open position. In addition, if the pressure in the housing is greater than the line pressure on both sides of the valve, both, or all, the port closure elements are hydraulically forced outwardly against their seats so that the entire head is bound or wedged, so to speak, in place. This binding effect (pressure lock) renders movement of the valve from closed to open position difficult to initiate.

Existing rotary plug valves having a cylindrical sectional head construction have the additional shortcoming that the seating forces, applied to the port closure elements, are not distributed uniformly about the valve housing, thus causing distortion of the cylindrical sealing surfaces of the housing with resulting leakage.

For use under low pressure and low temperature conditions, the housings of plug valves having a sectional rotary head sometimes are filled with a lubricant. In valves of known design, clearances exist between the head and the housing about the housing ports when the valve is in open position, thus permitting escape of the lubricant into the fluid flowing through the valve. Furthermore, in such valves complete lubrication of all the relatively moving sealing surfaces is had only through the provision of special grease grooves therebetween, which conduct the lubricant to the points necessary or desired to be lubricated.

In known plug valve constructions which have a sectional cylindrical head or plug rotating in a cylindrical bore, the entire outer surface of the plug does not sealingly contact the cylindrical wall of the bore when the valve is sealed. In fact, usually not more than half of the surface area of the plug is in such contact. This lack of sealing contact is due to the fact that the diameter of certain parts of the sectional plug must be made slightly smaller than the diameter of the bore. Such proportions are necessary in known structures not only to permit assembly of the valve, but also to permit rotation of the plug in the bore. Hence, an imperfect seal is had between the plug and the wall of the bore.

In rotary plug valves of the type under consideration clearances exist between the plug and the wall of the bore when the valve is unsealed. These clearances usually prohibit the use of such valves with fluids carrying abrasive material, such as drilling mud, because the grit in the fluids becomes lodged between the plug and the wall of the bore and prevents a seal from being effected therebetween. In addition, the cutting action of the abrasive has a detrimental effect on metal sealing surfaces of such valves.

Accordingly, it is an object of this invention to provide a rotary plug valve having a sectional head in which no wiping action occurs between the sealing surfaces of the valve while such surfaces are under load, thus avoiding leak-causing wear.

A further object of this invention is to provide a rotary plug valve having a sectional head that is provided with means for positively overcoming the adverse effects of a pressure lock condition.

Another object of this invention is to provide a cylindrical plug valve of the type under consideration in which the radial seating forces, applied to portions of the head, are uniformly distributed about the valve housing in order to avoid distortion of the cylindrical seating surfaces thereof and consequent leakage.

Another object of this invention is to provide a rotary plug valve which, when the valve is in open position, forms a tightly sealed conduit therethrough which not only prevents escape of lubricant from the housing into the fluid flowing through the valve, but also provides for unobstructed flow of fluid therethrough.

Still another object of this invention is to provide a rotary plug valve which does not require special grooves in the sealing surfaces thereof to conduct a lubricant to and between such relatively moving surfaces, and in which these surfaces are automatically lubricated each time the valve is operated.

Still another object of this invention is to provide a rotary plug valve having a sectional or multipart cylindrical plug the entire outer cylindrical surface of which, when the valve is sealed, makes forceful sealing contact with the cylindrical wall of the bore in which the plug rotates.

Still another object of this invention is to provide a rotary plug valve, of the type having an expansible segmental valve plug, with means to enable the valve to effectively handle fluids laden with abrasive materials.

Still another object of the invention is to provide an improved rotary plug valve which is simple in construction, easily operated, and which has a long life in service involving high pressure, high temperature, and/or corrosive conditions.

Other objects and advantages of the invention will be evident from the following description and accompanying drawings in which.

Referring now to the drawings, there is shown a rotary plug valve embodying the novel features of this invention. The valve has the usual housing 10 provided with aligned ports 11 and 12, opening to a cylindrical valve chamber in which is mounted a ported cylindrical head or plug, generally indicated at 13. The valve chamber is formed by a transverse bore in the housing 10 which is closed at one end by a closure member 14 secured, as by bolts 15, to the housing. The cylindrical wall of the bore is machined to provide an accurate seat for the mating cylindrical surfaces of the plug 13, as later described. A valve stem 16 extends from the plug 13 through the usual packing gland 17 at one end of the chamber and is provided with an operating handle 18, rotation of which rotates the valve plug between open and closed positions. The valve stem 16 also may be moved axially by a sleeve 19, which is mounted on the outer end of the valve stem and is rotatable by a handle 20. The sleeve 19 is threadedly received within a collar 21 which is secured and supported in spaced relationship to the housing 10 by legs 22. The sleeve 19 and the valve stem 16 are rotatably connected by a ring 23 interposed therebetween and seated in aligned annular grooves 24 and 25 formed in the outer and inner surfaces of the valve stem and the sleeve, respectively. With this construction, it will be seen that the valve stem 16 may be rotated with respect to the sleeve 19 to open or close the valve, and that rotation of the sleeve 19, by the handle 20, will axially displace, i. e. raise or lower, the valve stem.

Figure 5:
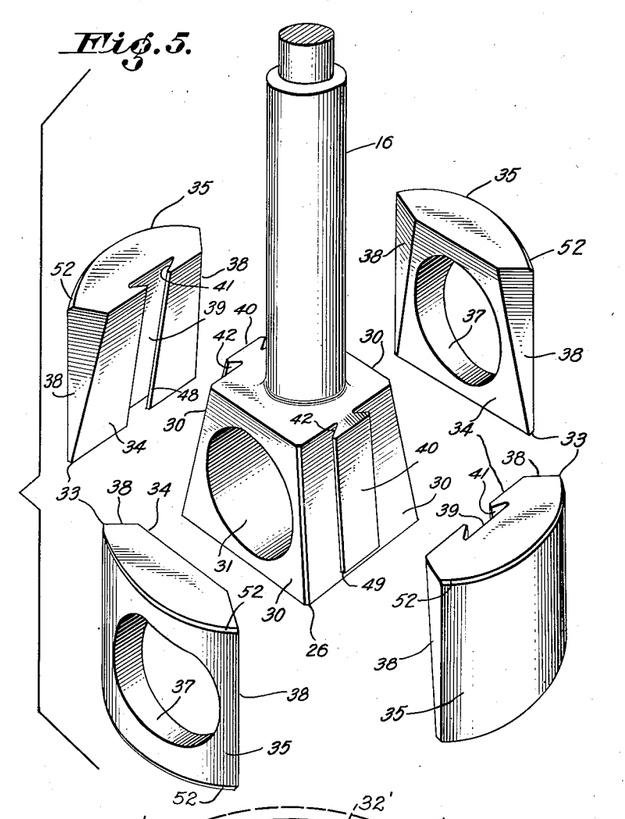
Figure 5 is an exploded perspective view of the component parts of the valve head or plug.

The valve plug 13, best shown in Figure 5, is of multi-part or sectional construction, having a central core 26 secured to, and preferably integral with, the valve stem 16. That end of the core 26 opposite the valve stem is provided with a support or guide member 27 which is journalled for rotation and axial displacement in a bearing recess 28 formed in the closure member 14. Threaded into the closure member 14 is a pressure lubrication fitting 29, of known construction, which communicates with the bottom of the recess 28. A passageway 27a in the support 27 conducts lubricant, forced into the recess 28 through the fitting 29, to the cylindrical valve chamber for distribution as later described. The core 26 is of rectangular frusto-pyramidal shape, as shown, to provide four flat side faces 30 inclined to the rotational axis of the core. A passageway 31 extends transversely through the core and opens to opposite side faces 30 thereof.

Interposed between each of the inclined side faces 30 of the core 26 and the cylindrical side wall 32 of the valve chamber is a segment 33 having a flat inner face 34 and an arcuate outer sealing face 35. The inner face 34 of each segment is parallel to the corresponding juxtaposed side face 30 of the core. This construction provides a set of four pairs of wedging surfaces which are effective to force the segments radially outwardly of the plug 13 to seat the outer faces 35 against the chamber wall 32 upon relative endwise (i. e. axially of the plug) displacement between the segments and the core in one direction. The opposed parallel faces 30 and 34 of the core and the segment are shown in the drawings as being flat, but it will be understood, however, that these cooperating faces may be of any suitable configuration, such as arcuate, which provides wedging surfaces that are effective to accomplish not only the desired radial expansion of the plug 13, but also rotation of the segments 33 with the core 26.

Figure 3:
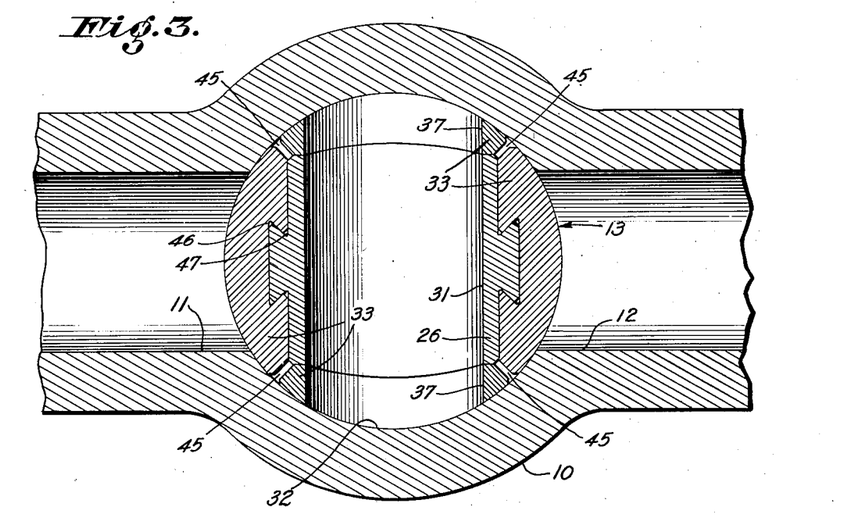
Figure 3 is a sectional view taken on line 3—3 of Figure 1.
Figure 4:
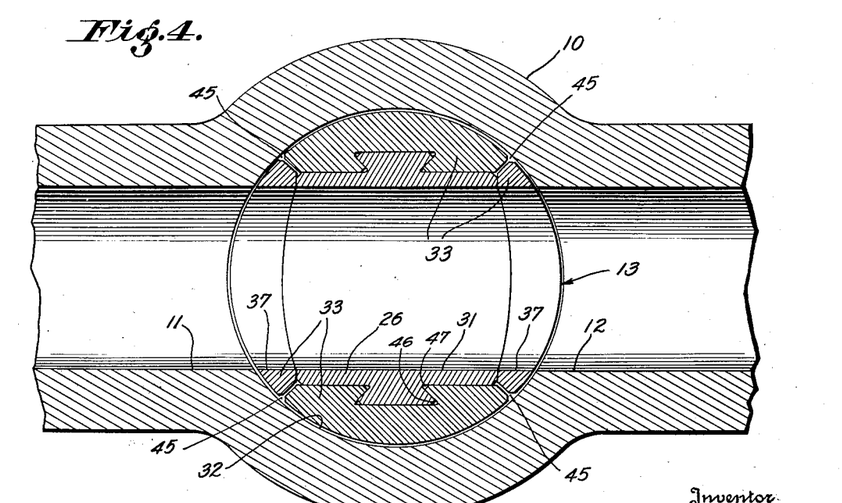
Figure 4 is a sectional view taken on line 4—4 of Figure 2.

The radius of curvature of the arcuate outer face 35 of each segment is the same as that of the cylindrical wall 32 of the chamber in order to provide sealing surfaces that are exactly mated when in sealing engagement. In the event that the valve is to be employed for extra high pressure service, the radius of curvature of the outer faces 35 of the segments may even be slightly greater than that of the chamber wall 32 for reasons later described. The opposite ends of each segment 33 are slidingly engaged for circular movement against annular shoulders or abutments 36 formed on the end walls of the valve chamber. The shoulders 36 hold the segments against movement axially of the chamber upon axial displacement of the core 26, but permit the segments to turn or rotate as a unit with the core for opening and closing the valve. Those segments 33 which are disposed adjacent the ends of the passageway 31 through the core are provided with ports 37, which, in the open position of the valve, are adapted to be registered, exactly, with the ports 11 and 12 in the housing and the passageway 31 through the core to permit unobstructed flow through the valve. The two ported segments for convenience may be termed port opening segments. The remaining two segments, which are imperforate, may be termed port closing segments. The peripheral length of the arcuate sealing surface 35 of each segment is only slightly less than one-fourth of the circumference of the cylindrical wall 32 of the chamber, so that only a small clearance exists between adjacent side edges 38 of the segments when the plug is expanded, as shown in Figure 3, and these side edges are substantially in contact when the plug is contracted, as shown in Figure 4.

Figure 1:
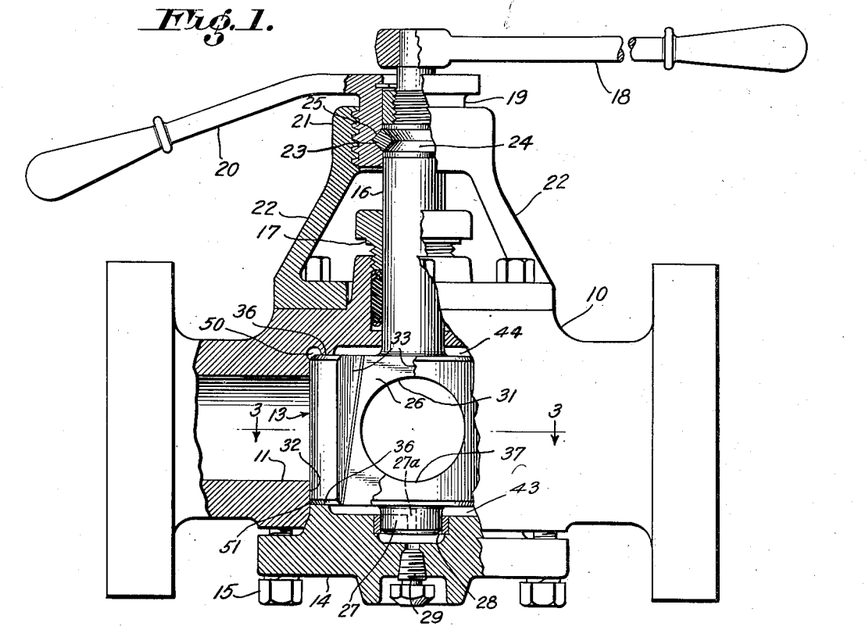
Figure 1 is an elevational view, partly in section, of a rotary plug valve embodying this invention, with the valve shown in closed and sealed position. A portion of the valve head is broken away to illustrate details more clearly.

With the structure thus far described, it will be seen that rotation of the valve stem 16 by the handle 18 turns the core 26, which carries along the segments 33, to open or close the valve. The valve may be positively sealed in either open or closed position by axial displacement of the core 26 with the handle 20. Thus, upward movement of the core expands the plug 13 by imparting a wedging action between the core and the segments, which action is effective to force the segments radially outwardly of the plug so that their arcuate outer faces 35 move into tight sealing engagement with the cylindrical wall 32 of the valve chamber, as shown in Figures 1 and 3. Since the radius of curvature of the sealing faces of the segments is the same as or slightly greater than that of the side wall 32 of the chamber, complete surface contact is had therebetween and, hence a perfect seal is effected. It also is pointed out that the plug expands radially in four different directions spaced uniformly about its axis and that substantially the entire surface area of the cylindrical wall 32 of the valve chamber is thereby contacted by the outer surface of the segments, so that the seating forces imparted by the segments to the housing 10 are distributed uniformly about the chamber side wall, thus avoiding any distortion of this wall from a true cylindrical shape. It also will be noted that the effective area of contact of the wedging surfaces between the port closing segments and the core is quite large and, in fact, completely overlies the housing ports 11 and 12 when the valve is closed. Because of this construction, the expansive or seating forces are applied evenly to the port closing segments to eliminate possible distortion thereof. An additional feature is the fact that the effective area of contact of the wedging surfaces between the port opening segments and the core extends completely around the segment ports 31 to form a sealed joint between these ports and the core passageway 31 when the valve is open. Hence, when the valve is open, the core passageway 31, the segment ports 37, and the housing ports 11 and 12 form a sealed conduit through the valve so that any lubricant in the housing, i. e. between the plug and the valve chamber walls, cannot be washed therefrom, by fluid flowing through the valve. Furthermore, such a sealed conduit provides for unobstructed flow through the valve.

Opposite or downward movement of the core 26 by the handle 20 releases the wedging action between the core and the segments, which release is effective to relieve the mechanical seating load on the sealing surfaces of the valve. Hence, no mechanical load exists on the valve sealing surfaces when a wiping action occurs therebetween upon rotation of the plug by the handle 18 to open or close the valve.

Figure 2:
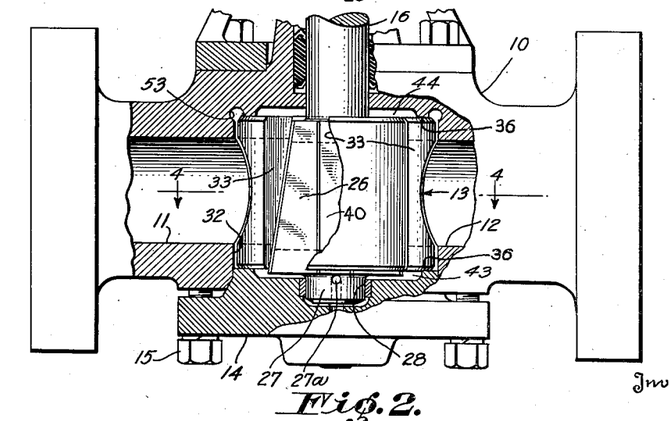
Figure 2 is an elevational view, corresponding to Figure 1, with the valve shown in open and unsealed position.

In order to avoid the development of a pressure lock situation when the valve is closed and also to avoid an hydraulic load on the sealing surfaces during their relative rotary movement, means are provided for moving the port closing segments radially inwardly upon relief of the mechanical seating load, in order to positively unseal the valve and equalize any existing pressure differential that may load the sealing surfaces hydraulically. Such radial inward movement is accomplished by connecting each port closing segment 33 to the core 26 by a dovetailed groove 39 and tongue or rib 40, as shown. The cooperating undercut side faces 41 and 42 of the groove and rib, respectively, provide opposed parallel wedging surfaces inclined to the rotational axis of the core which are effective to force the port closing segments radially inwardly, as shown in Figures 2 and 4, upon axial movement of the core in a direction to relieve the mechanical seating load on the sealing surfaces of the valve. It will be seen that with proper proportioning, the outer face of the rib 40 and the bottom of the groove 39 may cooperate as wedging surfaces to assist the wedging action between the faces 30 and 34 in the expansion of the plug. This rib and groove connection also assists the core to rotate the port closing segments without wedging or binding. A similar dovetailed connection may also be provided between the port opening segments and the core in order to effect a positive unsealing movement of these segments. Such movement of the port opening segments is not essential, however, since a wiping action between sealing surfaces results in detrimental wear usually only when such surfaces are under load, and there is no possibility that a pressure differential will hydraulically load the port opening segment sealing surfaces. The port opening segments, however, may be keyed or otherwise connected to the core (not shown) for rotary movement thereby, without the contracting effect, in order to eliminate any possible binding or wedging of these segments.

The operation of the valve is evident from the above description. Assuming the valve in the closed and sealed position, as shown in Figure 1, the handle 20 is first operated to contract the plug 13 and thus positively unseal the valve. The handle 18 may then be operated to turn the plug into open position (Figure 2) where it is again expanded by the handle 20 to seal the valve. Conventional stops (not shown) may be provided within the valve chamber or on the outside of the housing for limiting the rotary movement of the plug between open and closed positions.

The basic design of the expansible plug plus certain other features provide a unique lubrication system for the valve. The space between each end of the plug assembly and the corresponding end wall of the valve chamber provides annular lubricant reservoirs 43 and 44. Lubricant supplied to the reservoir 43, through the fitting 29 and passageway 27a, flows through channels 45 (see Figures 3 and 4) to the reservoir 44. These channels 45 are formed by the clearances existing between adjacent side edges 38 of the segments. In addition to the channels 45, the reservoirs 43 and 44 may be connected by passageways 46 and 47 formed by clearances in the rib and groove connection between the core and the port closing segments. These clearances are provided by bevelling the edges of the groove 39 and the rib 40, as indicated at 48 and 49, respectively, in Figure 5. In addition to the annular reservoirs 43 and 44, annular passageways or channels 50 and 51 (see Figure 1) contain lubricant. These channels 50 and 51 may be formed by bevelling the end edges of the outer arcuate surfaces of the segments, as shown at 52 (see Figure 5), and/or by grooving the chamber wall as indicated at 53 (see Figure 2).

After the housing has been filled with lubricant, the automatic operation of the lubrication system is as follows. When the valve is in sealed position, i. e. with the plug assembly expanded, as shown in Figures 1 and 3, the channels 45 are full of lubricant. During the unsealing movement of the valve, i. e. when the plug assembly is contracted to the position shown in Figures 2 and 4, the channels 45 become narrower, thus ejecting the lubricant therein outwardly onto the surface of the chamber wall 32 and between this wall and the arcuate outer faces 35 of the segments. Subsequent rotation of the plug assembly to open or close the valve spreads the lubricant over the entire sealing surfaces of the valve. When the valve is resealed, the channels 45 widen and receive lubricant forced from between the sealing surfaces by expansion of the plug assembly.

It also will be noted that rotation of the plug assembly slides the ends of the lubricant filled channels 45 over the annular abutments 36 to ensure proper lubrication between the latter and the ends of the segments. In addition, the passageways 46 and 47 assure adequate lubrication of the sliding connection between the core and the port closing segments. Thus, the valve is lubricated automatically every time it is opened or closed.

Figure 6:
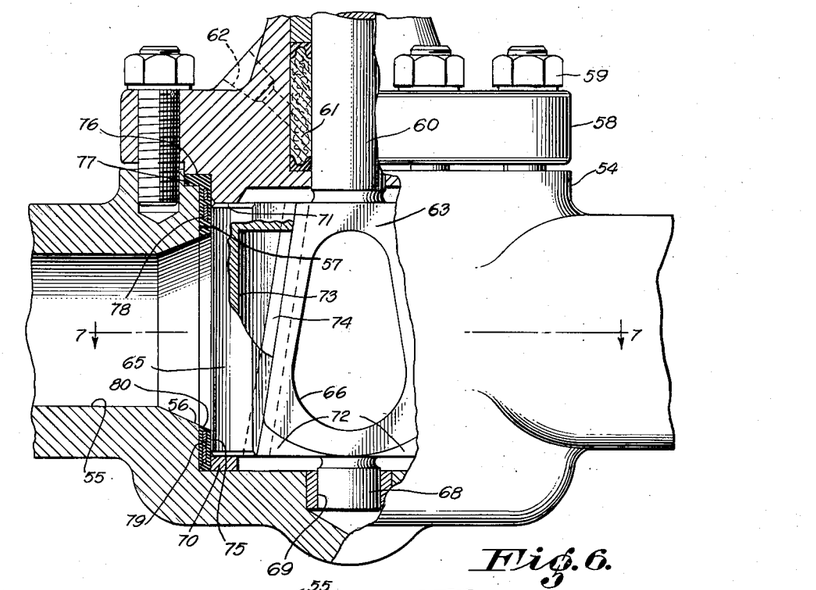
Figure 6 is a fragmentary elevational view, partly in section, of a modified form of rotary plug valve embodying this invention, with the valve shown in closed and sealed position. One section of the valve head has been removed and a portion of another section broken away to show details more clearly.
Figure 7:
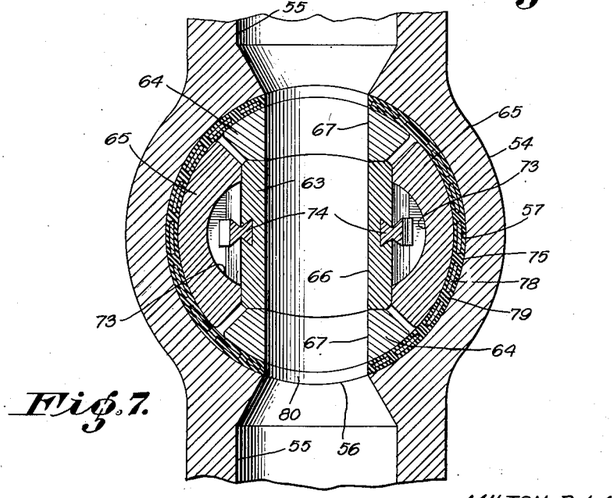
Figure 7 is a sectional view taken on line 7—7 of Figure 6, showing the valve in open and sealed position.

Figures 6 and 7 show a modified form of rotary plug valve embodying this invention which is equipped with means to enable the valve to effectively handle fluids carrying abrasive material. Although the basic principles of the valve illustrated in Figures 1 through 5 are retained in this modification, some structural differences exist. The valve has a housing 54 provided with aligned cylindrical passageways 55 terminating in egg-shaped ports 56 that open to a cylindrical valve chamber. The valve chamber is formed by a transverse bore 57 closed by a closure member, or bonnet, 58 secured to the housing by bolts 59. The cross-sectional area of the ports 56 preferably is the same as that of the passageways 55.

A valve plug assembly, similar to that shown in Figures 1 through 5, is rotatably mounted within the valve chamber with the valve stem 60 extending through a packing gland 61 in the bonnet 58. The valve stem 60 is provided with means to effect both rotation and axial displacement thereof. The structure illustrated in Figure 1, or its equivalent, is suitable for this purpose. Lubricant may be conducted to the packing gland 61 through a conduit 62, in the outer end of which a pressure lubrication fitting (not shown) is adapted to be secured.

The valve plug assembly comprises a frusto-pyramidal core 63, two port opening segments 64, and two port closing segments 65, substantially the same as the valve plug assembly illustrated in Figures 1 through 5. The core 63 and the port opening segments 64 have ports 66 and 67, respectively, therethrough which are egg-shaped in transverse section to conform to the shape of the housing ports 56. This shape permits the use of a plug of less diameter than one having a cylindrical passageway therethrough, without effecting flow restriction. The base of the core 63 is provided with a support or guide member 68 which is journalled for rotation and axial displacement in a bearing recess 69 formed in the end wall of the bore 57. Axial displacement of the valve plug segments is prevented by an annular ring member 70 seated against the end wall of the bore 57 and an annular shoulder 71 on the bonnet 58 which projects into the bore. If the proportions of the plug assembly so require, the four corners of the base of the core 63 may be rounded, as indicated at 72, to eliminate possible interference between these corners and the ring member 70 upon axial displacement of the core (toward the ring member) to contract the valve plug assembly. It will be obvious that such interference also may be eliminated by terminating the base of the core 63 somewhat short of the ends of the segments. The port closing segments 65 may have recesses 73 in their inner surfaces which are juxtaposed the side faces of the core, both to save material and to lighten the valve plug assembly. These port closing segments are slideably fastened to the core by keys 74 which fit into undercut grooves or channels in the juxtaposed surfaces of the segments and core, respectively. This construction simplifies somewhat the manufacture of the core, in that the necessity of forming ribs (such as 40 in Figure 5) integral therewith is eliminated. Upon assembly, the keys 74 preferably are secured against movement in the core grooves by any conventional mechanical means, such as staking. Thus, a free sliding connection is effected between the port closing segments 65 and the core 63 by means of the keys 74.

Interposed between the valve plug assembly and the cylindrical wall of the bore 57 is a valve chamber liner 75. The liner is a one-piece molded unit of synthetic or natural rubber, or other material which possesses the desired characteristics of resiliency and resistance to abrasion. The liner 75 is of sleeve-like formation with a lip or rim 76 projecting radially outwardly at one end thereof. This lip fits in an annular recess 77 at the mouth of the bore 57, and is clamped between the bonnet 58 and the housing 54, when assembled, to provide a seal therebetween. The lip 76 also serves to anchor the liner securely in place in the bore. Preferably the liner is provided with a reinforcing metallic core or stiffening element 78, of bronze or material of similar characteristics. The core 78 is perforated at a plurality of places, as indicated at 79, in order that the rubber will flow therethrough and thus obtain a secure bond between the rubber and the core during the molding operation. The perforations 79 also somewhat increase the resiliency of the core. Ports 80 are provided in the liner 75 in alignment with the housing ports 56. The liner is pressed in place during assembly of the valve and may be replaced upon wear. It will be noted that only the narrow periphery of the ports 80 in the liner is exposed to the abrasive action of grit or sand laden fluids when the valve is sealed in either open or closed position.

The operation of this modified valve is the same as that shown in Figures 1 through 5. When the valve is unsealed, however, and the plug is contracted, abrasives carried in the fluid in the flow line may enter the clearance space between the liner and the segments. The resiliency of the liner permits such abrasives to be embedded therein when the plug is expanded to seat the segments against the inner wall of the liner. Thus, a complete seal may be effected, even with such fluids as drilling mud. In order to produce a more effective seal between the plug and the liner, the radius of curvature of the outer arcuate sealing faces of the segments preferably is somewhat greater than that of the cylindrical inner surface of the liner, although somewhat less than that of the cylindrical wall of the bore. It is unnecessary to lubricate the valve chamber of a valve of this type when equipped with a liner. Hence, no pressure lubrication fitting for introducing lubricant to the valve chamber is illustrated in Figures 6 and 7.

As previously stated, in the event that a plug valve embodying this invention is intended for extra high pressure service, the radius of curvature of the sealing faces of the segments should be slightly greater than that of the chamber wall. The reason for such construction is that the housing actually expands slightly under extremely high pressure, thus increasing the diameter of the valve chamber. Hence, if the segment sealing surfaces do not have a radius of curvature equal to this increased radius of curvature of the valve chamber, a perfect mating of the sealing surfaces of the valve cannot be had and the valve will leak. For example, if a valve chamber is normally 4 inches in diameter, a hydrostatic pressure of 6000 or 8000 lbs. per square inch will stretch the casing uniformly and may increase this diameter to 4 2/64 inches, a radius of curvature of 2 1/64 inches. The radius of curvature of the sealing surface of the segment should be the same, that is 2 1/64 inches.

Figure 8:
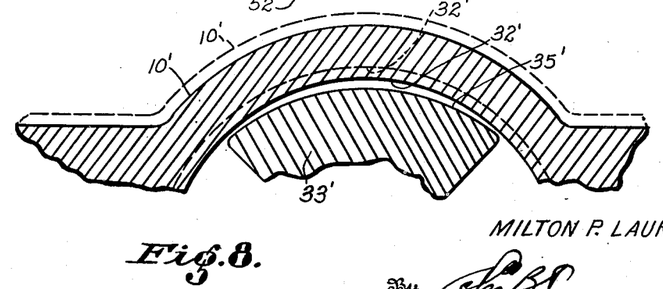
Figure 8 is a fragmentary view corresponding to Figure 4 illustrating a modification of the invention.

Figure 8 illustrates such a construction on an exaggerated scale. In this figure, it can be seen that the cylindrical side wall 32' of the valve chamber when not in service has a radius of curvature somewhat smaller than that of the sealing surface 35' of a segment 33'. When the valve is under high pressure, however, the valve casing 10' is stretched, as indicated by the dotted lines, and increases the radius of curvature of the cylindrical wall 32' of the valve chamber to substantially equal that of the sealing surface of the segment. Hence, when the valve is closed and sealed a perfect mating of the sealing surfaces 32' and 35' is obtained.

The invention has been illustrated by its application to a simple type of valve used only to control the flow of fluid in a line. It will be understood, however, that the invention is applicable to valves of the multi-way type. Accordingly, the plug may have a frusto-pyramidal core which is triangular, pentagonal, hexagonal, etc., i. e. have three, five, six, etc. sides, instead of rectangular as shown, with a corresponding number of segments.

It will be seen that a simple yet extremely effective and durable plug valve has been provided by this invention. Various structural changes which retain the basic principles of the invention readily will occur to one skilled in the art. Accordingly, the invention embraces all modifications which come within the spirit and scope of the following claims.

I claim:

1. A rotary plug valve comprising: a housing provided with a cylindrical chamber having at least one port opening through the side wall thereof; a sectional valve plug mounted for rotation in said chamber, said plug including an axially tapered core having at least three side faces, said core being mounted for displacement axially of said chamber and having a passageway therethrough with a port in at least one of said side faces; a segment interposed between each said side face and said chamber side wall, each said segment having an arcuate outer face opposed to said wall for sealing engagement therewith and an inner face parallel to the juxtaposed side face of said core, the segment overlying the ported side face of said core having a port therethrough adapted to be aligned with said housing port and said core port in the open position of the valve to permit flow therethrough, the sum of the lengths of the arcuate sealing faces of all the segments being substantially equal to the circumference of the cylindrical wall of the chamber and the length of the arcuate sealing faces of each segment being substantially equal; and abutment means in said housing for maintaining said segments against displacement axially of said chamber, whereby rotation of said core is effective to open and close the valve and axial displacement of said core in one direction is effective to uniformly force said segments radially outwardly and thereby expand said plug into sealing engagement with said cylindrical chamber wall.

2. The structure defined by claim 1 in which the radius of curvature of the arcuate face of each segment is at least as great as that of the cylindrical chamber wall.

3. The structure defined by claim 1 in which the radius of curvature of the arcuate face of each segment is slightly greater than that of the cylindrical chamber wall.

4. A rotary plug valve comprising: a housing provided with a cylindrical chamber having at least one port opening through the side wall thereof; a sectional valve plug mounted for rotation in said chamber; said plug including an axially tapered core having at least three side faces, said core being mounted for displacement axially of said chamber and having a passageway therethrough with a port in at least one of said side faces, and a segment interposed between each said side face and said chamber side wall, each said segment having an arcuate outer face opposed to said wall for sealing engagement therewith and an inner face parallel to the juxtaposed side face of said core, the segment overlying the ported side face of said core having a port therethrough adapted to be aligned with said housing port and said core port in the open position of the valve to permit flow therethrough; interconnecting means fastening each of the non-ported segments to said core for relative slidable movement between their juxtaposed faces; abutment means in said housing for maintaining said segments against displacement axially of said chamber; a lubricant reservoir between each end wall of said valve chamber and the corresponding end of said valve plug; lubricant channels in said plug connecting said reservoirs, said channels being formed by clearances between the side edges of each said non-ported segment and the next adjacent segment; and means to conduct a lubricant to one of said reservoirs, whereby rotation of said core is effective to open and close the valve, axial displacement of said core in one direction is effective to force said segments radially outwardly into sealing engagement with said chamber side wall and thereby widen said lubricant channels, and axial displacement of said core in the other direction is effective to force said non-ported segments radially inwardly out of sealing engagement with said chamber side wall and thereby narrow said lubricant channels.

5. A rotary plug valve comprising: a housing provided with a cylindrical chamber having diametrically opposed ports opening through the side wall thereof; a sectional valve plug mounted for rotation in said chamber, said plug including a core mounted for displacement axially of said chamber and having a transverse passageway therethrough, a pair of port closing segments, and a pair of port opening segments interposed between opposite sides of said core and said chamber side wall, each of said segments having an arcuate face opposed to said wall for sealing engagement therewith and each of said port opening segments having an opening therethrough adapted to be aligned with one of said housing ports and an end opening of said core passageway in the open position of the valve to permit flow therethrough, the sum of the lengths of the arcuate sealing faces of all the segments being substantially equal to the circumference of the cylindrical wall of the chamber and the length of the arcuate sealing faces of each segment being substantially equal; and abutment means in said housing for maintaining said segments against displacement axially of said chamber, the abutting sides of said core and each of said segments having parallel faces inclined to the rotational axis of said core to provide a set of wedging surfaces effective to force each of said segments radially outwardly of said plug and into sealing engagement with said chamber side wall upon axial displacement of said core in one direction.

6. The structure defined by claim 5 in which the abutting sides of the core and each of the port closing segments are interconnected to provide a second set of wedging surfaces effective to positively force said port closing segments radially inwardly of said plug and out of sealing engagement with the chamber side wall upon axial displacement of said core in the other direction.

7. The structure defined by claim 5 in which the effective area of contact of the set of wedging surfaces between the core and each port opening segment completely encircles the aligned ends of the core passageway and the segment opening.

8. In a rotary plug valve having a housing provided with a cylindrical chamber, at least one port opening through the side wall of said chamber, and a ported valve plug mounted for rotation in said chamber, said valve plug comprising: a symmetrical pyramidal core mounted for rotation in and for displacement axially of the chamber and having a passageway therethrough provided with an end opening in at least one side face of said core; a segment interposed between the side wall of the chamber and each of the side faces of said core, each of said segments having an outer arcuate face for sealing engagement with the side wall of the chamber and an inner face having at least a portion thereof opposed and parallel to the corresponding side face of the core to provide wedging surfaces effective to force said segments radially outwardly of the plug upon relative displacement between said segments and said core in one direction axially of the plug, the segment overlying said passageway opening having a port therethrough adapted to be aligned with said opening, the sum of the lengths of the arcuate sealing faces of all the segments being substantially equal to the circumference of the cylindrical wall of the chamber and the length of the arcuate sealing faces of each segment being substantially equal.

9. The structure defined by claim 8 including interfitting means connecting each non-ported segment to the juxtaposed side of the core for relative displacement axially of the plug, said means having opposed parallel faces inclined to the rotational axis of the plug to provide wedging surfaces effective to positively force said nonported segments radially inwardly of said plug upon relative displacement between said segments and said core in the other direction, axially of the plug.

10. In a rotary plug valve having a housing provided with a cylindrical chamber, diametrically opposed ports opening through the side of said chamber, and a ported valve plug mounted in said chamber, said plug comprising: a symmetrical rectangular frusto-pyramidal core mounted for rotation in and for displacement axially of the chamber and having a transverse passageway provided with end openings in opposite side faces thereof; a segment interposed between each of the side faces of said core and the cylindrical wall of the chamber, each of said segments having an outer arcuate face for sealing engagement with the cylindrical chamber wall and an inner face having at least a portion thereof opposed and parallel to the juxtaposed side face of the core, those segments overlying said passageway openings having ports therethrough which are adapted to be aligned with said openings, the sum of the lengths of the arcuate sealing faces of all the segments being substantially equal to the circumference of the cylindrical wall of the chamber and the length of the arcuate sealing faces of each segment being substantially equal; rotation of the plug being effective to open and close the valve, and axial displacement of said core relative to said segments in one direction being effective to force each of said segments radially outwardly and thereby expand the plug into sealing engagement with the cylindrical wall of the chamber.

11. In a rotary plug valve having a housing provided with a cylindrical chamber, diametrically opposed ports opening through the side of said chamber, and a ported valve plug mounted in said chamber, said plug comprising: a symmetrical rectangular frusto-pyramidal core mounted for rotation in and for displacement axially of the chamber and having a transverse passageway provided with end openings in opposite side faces thereof; a segment interposed between each of the side faces of said core and the cylindrical wall of the chamber, each of said segments having an outer arcuate face for sealing engagement with the cylindrical chamber wall and an inner face having at least a portion thereof opposed and parallel to the juxtaposed side face of the core, those segments overlying said passageway openings having ports therethrough which are adapted to be aligned with said openings; and the remaining segments being slideably connected to said core by a dovetail joint for relative displacement axially of the plug; rotation of the plug being effective to open and close the valve, and axial displacement of said core relative to said segments in one direction being effective to force said segments radially outwardly and thereby expand the plug into sealing engagement with the cylindrical wall of the chamber and in the other direction to positively force said remaining segments radially inwardly out of sealing engagement with the chamber wall.

12. A rotary plug valve comprising: a housing provided with a cylindrical chamber having diametrically opposed ports opening through the side wall thereof; a rectangular frusto-pyramidal valve plug core mounted for rotation and axial displacement in said chamber, said core having a transverse passageway with ports in opposite side faces of said core; a valve plug segment interposed between each of the side faces of said core and the cylindrical side wall of said chamber, each of said segments having an arcuate outer face for sealing engagement with said chamber side wall and an inner face having at least a portion thereof opposed and parallel to the juxtaposed side face of said core, the arcuate length of the sealing face of each of said segments being substantially equal to one-fourth of the circumference of said chamber side wall; those segments juxtaposed the ported faces of said core having ports therethrough which are adapted to be registered with said housing ports and said passageway ports in the open position of the valve to permit unobstructed flow therethrough; interconnecting means fastening each of the non-ported segments to the core for relative slideable movement between their juxtaposed faces in a direction normal to the base line of the corresponding core face; and an annular shoulder at each end of said chamber to maintain said segments against displacement axially of said chamber, whereby rotation of said core is effective to rotate said segments therewith to open and close the valve, and axial displacement of said core in one direction is effective to force said segments radially outwardly into sealing engagement with said chamber side wall, and in the other direction to force said non-ported segments radially inwardly out of sealing engagement with said chamber wall.

13. A rotary plug valve comprising: a housing provided with a cylindrical chamber having diametrically opposed ports opening through the side wall thereof; a symmetrical rectangular frusto-pyramidal valve plug core mounted for rotation in and displacement axially of said chamber, said core having a transverse passageway with ports in two opposite side faces of said core; a valve plug segment interposed between each of the side faces of said core and the cylindrical side wall of said chamber, each of said segments having an arcuate outer face for sealing engagement with said chamber side wall and an inner face opposed and parallel to the juxtaposed side face of said frusto-pyramidal core, said outer face of each segment having the same radius of curvature as said wall and an arcuate length slightly less than one-fourth of the arcuate length of said wall, said inner face of each segment having substantially the same configuration and area as each side face of said core, the core and segments, when assembled, forming a substantially cylindrical valve plug; those segments overlying the ported side faces of said core having ports therethrough which are adapted to be registered with said housing ports and said passageway ports in the open position of the valve to permit unobstructed flow therethrough; an undercut tongue and groove joint slideably connecting each of the non-ported segments to said core, the tongue and groove of said joint extending in a direction normal to the base line of the corresponding side face of said core; and an annular shoulder at each end of said chamber to maintain said segments against displacement axially of said chamber.

14. A rotary plug valve comprising: a housing provided with a cylindrical chamber having at least one port opening through the side wall thereof; a sectional valve plug mounted for rotation in said chamber and having a passageway therethrough which opens through at least one side of said plug, the side opening in said plug being adapted to be aligned with said housing port in the open position of the valve to permit flow therethrough; said plug including a core mounted for displacement axially of said chamber, at least one port sealing segment, and at least one port opening segment, each of said segments being interposed between said core and said chamber side wall and having an arcuate face opposed to said wall for sealing engagement therewith, said port opening segment having an opening therethrough constituting the side opening in the plug; abutment means within said housing for maintaining said segments against displacement axially of said chamber, the abutting sides of said core and each of said segments having opposed parallel plane faces inclined to the rotational axis of said plug to provide sets of wedging surfaces effective to force said segments radially outwardly of said plug and into sealing engagement with said chamber side wall upon axial displacement of said core in one direction; and interfitting means connecting said port closing segment to said core, said means being provided with opposed parallel faces inclined to the rotational axis of said core to provide an additional set of wedging surfaces effective to positively force said port closing segment radially inwardly of said plug upon axial displacement of said core in the other direction.

15. A rotary plug valve comprising: a housing provided with a cylindrical chamber having at least one port opening through the side wall thereof; a ported sectional valve plug mounted for rotation in said chamber, said plug including at least three radially movable segments having arcuate outer faces opposed to the inner face of said cylindrical chamber, the sum of the arcuate lengths of said segment outer faces being substantially equal to the circumference of the inner surface of said chamber, the length of the arcuate sealing faces of each segment being substantially equal, and at least one of said segments having a port therethrough adapted to be aligned with said housing port to permit flow therethrough in the open position of the valve; and means for positively forcing each of said segments radially outwardly into sealing engagement with said cylindrical chamber wall.

16. A rotary plug valve comprising: a housing provided with a cylindrical chamber having at least one port opening through the side wall thereof; a cylindrical liner snugly fitting said chamber side wall, said liner being of resilient material and having at least one port therethrough aligned with said housing port; a sectional valve plug mounted for rotation in said chamber, said plug including at least three radially movable segments having arcuate outer faces opposed to the inner surface of said liner for sealing engagement therewith, the radius of curvature of the arcuate outer faces of the segments being slightly greater than that of the inner surface of the liner, the sum of the arcuate lengths of said segment outer faces being substantially equal to the circumference of the inner surface of said liner, the length of the arcuate sealing faces of each element being substantially equal, and at least one of said segments having a port therethrough adapted to be aligned with said liner port in the open position of the valve to permit flow therethrough; and means for positively forcing each of said segments radially outwardly into sealing engagement with said inner liner surface.

17. A rotary plug valve as defined by claim 15 and including a cylindrical liner snugly fitting said chamber side wall, said liner being of resilient material and having at least one port therethrough aligned with said housing side wall port.

MILTON P. LAURENT.

REFERENCES CITED

The following references are of record in the file of this patent:

UNITED STATES PATENTS

| Number | Name | Date |
|---|---|---|
| 733,905 | Erdman | July 14, 1903 |
| 1,250,041 | Snyder | Dec. 11, 1917 |
| 1,760,951 | Manifold | June 3, 1930 |
| 1,803,773 | Schmidt | May 5, 1931 |
| 2,234,434 | Johnson | Mar. 11, 1941 |
| 2,290,349 | Ohls | July 21, 1942 |
| 2,308,300 | Parker | Jan. 12, 1943 |
| 2,376,975 | Morgan | May 29, 1945 |